(12) United States Patent
Scarpelli et al.

(10) Patent No.: US 8,463,899 B2
(45) Date of Patent: Jun. 11, 2013

(54) SYSTEM, METHOD AND COMPUTER PROGRAM PRODUCT FOR OPTIMIZED ROOT CAUSE ANALYSIS

(75) Inventors: Joe Scarpelli, Mountain View, CA (US); Sridhar Sodem, Cupertino, CA (US); Ronald Alexander LeFaive, Sunnyvale, CA (US)

(73) Assignee: BMC Software, Inc., Houston, TX (US)

( * ) Notice: Subject to any disclaimer, the term of this patent is extended or adjusted under 35 U.S.C. 154(b) by 386 days.

(21) Appl. No.: 12/608,601

(22) Filed: Oct. 29, 2009

(65) Prior Publication Data

US 2010/0050023 A1 Feb. 25, 2010

Related U.S. Application Data

(63) Continuation-in-part of application No. 11/308,430, filed on Mar. 24, 2006, now Pat. No. 7,783,744, which is a continuation of application No. 11/161,313, filed on Jul. 29, 2005, now Pat. No. 7,502,844.

(60) Provisional application No. 61/110,289, filed on Oct. 31, 2008.

(51) Int. Cl.
*G06F 15/16* (2006.01)
(52) U.S. Cl.
USPC .......................................................... 709/224
(58) Field of Classification Search
None
See application file for complete search history.

(56) References Cited

U.S. PATENT DOCUMENTS

| 5,699,403 | A | 12/1997 | Ronnen |
| 6,327,677 | B1 | 12/2001 | Garg et al. |
| 6,453,346 | B1 | 9/2002 | Garg et al. |
| 6,707,795 | B1 | 3/2004 | Noorhosseini et al. |
| 6,886,113 | B2 | 4/2005 | McKenzie et al. |
| 7,131,037 | B1 | 10/2006 | LeFaive et al. |
| 7,502,844 | B2 | 3/2009 | Garg |
| 2002/0111755 | A1* | 8/2002 | Valadarsky et al. ............. 702/58 |
| 2002/0184354 | A1 | 12/2002 | McKenzie et al. |
| 2002/0188715 | A1 | 12/2002 | McKenzie et al. |
| 2004/0073844 | A1 | 4/2004 | Unkle et al. |
| 2004/0223461 | A1 | 11/2004 | Scrandis et al. |
| 2004/0249931 | A1 | 12/2004 | Garg et al. |
| 2005/0174564 | A1* | 8/2005 | Fee .............................. 356/73.1 |
| 2006/0200373 | A1* | 9/2006 | Garg et al. ....................... 705/9 |
| 2006/0265353 | A1 | 11/2006 | Garg et al. |
| 2008/0114581 | A1* | 5/2008 | Meir et al. ...................... 703/13 |

OTHER PUBLICATIONS

Christopher Crowell "Event Correlation and Root Cause Analysis," White Paper, CA, 15 pgs, Mar. 2004.

(Continued)

*Primary Examiner* — Scott Christensen (57) ABSTRACT

Embodiments disclosed herein can significantly optimize a root cause analysis and substantially reduce the overall time needed to isolate the root cause or causes of service degradation in an IT environment. By building on the ability of an abnormality detection algorithm to correlate an alarm with one or more events, embodiments disclosed herein can apply data correlation to data points collected within a specified time window by data metrics involved in the generation of the alarm and the event(s). The level of correlation between the primary metric and the probable cause metrics may be adjusted using the ratio between theoretical data points and actual points. The final Root Cause Analysis score may be modified depending upon the adjusted correlation value and presented for user review through a user interface.

20 Claims, 4 Drawing Sheets

OTHER PUBLICATIONS

[ITU-T] Recommendation X.700. Management framework for Open Systems Interconnection (OSI) for CCITT applications, 15 pgs, Sep. 1992.

J. Frey, et al. "Multi-Level Reasoning for Managing Distributed Enterprises and Their Networks," Integrated Network Management V, Chapman and Hall, 9 pgs, 1997.

Masum Hasan et al., "A Conceptual Framework for Network Management Event Correlation and Filtering Systems," Integrated Network Management VI, IEEE Press, 10 pgs, 1999.

K Houck, et al. "Towards a Practical Alarm Correlation System," Integrated Network Management IV, Chapman and Hall, 18 pgs, 1995.

Gabriel Jakobson, et al. "Alarm Correlation," IEEE Network, 7(6): pp. 52-59, Nov. 1993.

G. Jakobson, et al. "Real-Time Telecommunications Network Management: Extending Event Correlation with Temporal Constraints," Integrated Network Management IV, Chapman and Hall, 8 pgs, 1995.

S. Katker, et al., "Fault Isolation and Event Correlation for Integrated Fault Management," Integrated Network Management V, Chapman and Hall, 11 pgs, 1997.

Irene Katzela, et al. "Schemes for Fault Identification in Communication Networks," IEEE Transactions on Networking, 3(6): pp. 753-764, Dec. 1995.

I. Katzela, et al. "*Centralized* vs. *Distributed Fault Localization*," IFIP/IEEE International Symposium on Integrated Network Management IV ((ISINM '95), pp. 250-261, 1995.

Walter Kehl, et al. "Model-Based Reasoning for the Management of Telecommunication Networks," IEEE International Conf. on Communications, ICC '93, pp. 13-17, 1993.

Shaula Alexander Yemini, et al. "High Speed and Robust Event Correlation", IEEE Communications Magazine, pp. 82-90, May 1996.

S. Klinger, et al. "A Coding Approach to Event Correlation," Integrated Network Management IV, Chapman and Hall, 7 pgs, 1995.

G. Liu, et al. "Composite Events for Network Event Correlation," Integrated Network Management IV, IEEE Press, 10 pgs, 1999.

Y.A. Nygate "Event Correlation Using Rule and Object Based Techniques," Integrated Network Management IV, Chapman and Hall, 8 pgs, 1995.

Lundy Lewis "Managing Computer Networks: A Case-Based Reasoning Approach," Artech House, 81 pgs, 1995.

Dilmar Malheiros Meira "A Model for Alarm Correlation in Telecommunications Networks," PhD Thesis, Computer Science Department, Federal University of Minas Gerais, Belo Horizonte, Brazil, 170 pgs, 1997.

\* cited by examiner

| Select | Time Opened | Monitor | Severity | Description | | Score |
|---|---|---|---|---|---|---|
| ☐ | 09/17/09 05:22 PM PDT | training4.labs.bmc.com pruner | ◆ | Solaris Process Availability below 100% | | ▨ |
| ☐ | 09/17/09 05:15 PM PDT | training4.labs.bmc.com http://172.23.30.84 | ◆ | Web URL Availability below 100% | | ▨ |
| ☐ | 09/17/09 05:15 PM PDT | training4.labs.bmc.com httpd | ◆ | Solaris Process Availability below 100% | | ▨ |
| ☐ | 09/17/09 04:56 PM PDT | training4.labs.bmc.com Solaris TCP | ⚠ All | Solaris TCP Connections Passive, 13.070 per sec is above All Baselines | | ▨ |
| ☐ | 09/17/09 05:28 PM PDT | training4.labs.bmc.com httpd | ▽ | Solaris Process Total Process CPU Utilization above 0.500% | | ▨ |
| ☐ | 09/17/09 05:27 PM PDT | training4.labs.bmc.com server | ▽ | Solaris Process Total Process CPU Utilization above 0.500% | | ▨ |
| ☐ | 09/17/09 05:23 PM PDT | training4.labs.bmc.com servlets | ▽ | Solaris Process Total Process CPU Utilization above 0.500% | 109 | ▨ |
| ☐ | 09/17/09 05:20 PM PDT | training4.labs.bmc.com pruner | ▽ | Solaris Process Total Process CPU Utilization above 0.500% | | ▨ |
| ☐ | 09/17/09 05:17 PM PDT | training4.labs.bmc.com services | ⚠ All | Web URL First Byte Download Time, 795 ms is above All Baselines | | ▨ |
| ☐ | 09/17/09 05:09 PM PDT | training4.labs.bmc.com http://172.23.30.84 | ⚠ Hourly | Solaris System System Load, 7.067 # is above Hourly Baseline | | ▨ |
| ☐ | 09/17/09 05:13 PM PDT | training4.labs.bmc.com /usr/.../liveNet.log | ⚠ Hourly | Log File Occurrences (Pattern 1), 40 # is above Hourly Baseline | | ▨ |
| ☐ | 09/17/09 05:09 PM PDT | training4.labs.bmc.com train.Solaris System | ⚠ Hourly | Solaris System Swap Space Used, 23.618 % is above Hourly Baseline | | ▨ |

SYSTEM, METHOD AND COMPUTER PROGRAM PRODUCT FOR OPTIMIZED ROOT CAUSE ANALYSIS

CROSS-REFERENCE TO RELATED APPLICATIONS

The present application is a continuation-in-part of U.S. patent application Ser. No. 11/308,430, filed Mar. 24, 2006, Publication No. 2006/0200373, entitled "FACILITATING ROOT CAUSE ANALYSIS FOR ABNORMAL BEHAVIOR OF SYSTEMS IN A NETWORKED ENVIRONMENT," which is a continuation of U.S. patent application Ser. No. 11/161,313, file Jul. 29, 2005, issued as U.S. Pat. No. 7,502,844, entitled "ABNORMALITY INDICATOR OF A DESIRED GROUP OF RESOURCE ELEMENTS," which relates to co-pending U.S. patent application Ser. No. 10/452,134, filed Jun. 3, 2003, entitled, "NETWORK MANAGEMENT SYSTEM TO MONITOR MANAGED ELEMENTS," and Ser. No. 11/160,664, filed Jul. 5, 2005, entitled, "MONITORING SEVERAL DISTRIBUTED RESOURCE ELEMENTS AS A RESOURCE POOL." The present application claims priority from U.S. Provisional Application No. 61/110,289, filed Oct. 31, 2008, entitled "METHOD AND SYSTEM FOR OPTIMIZED SERVICE-IT ROOT CAUSE CORRELATION" and is related to U.S. Pat. No. 7,131,037, entitled "METHOD AND SYSTEM TO CORRELATE A SPECIFIC ALARM TO ONE OR MORE EVENTS TO IDENTIFY A POSSIBLE CAUSE OF THE ALARM," No. 6,453,346, entitled "METHOD AND APPARATUS FOR INTELLIGENT STORAGE AND REDUCTION OF NETWORK INFORMATION", and No. 6,327,677, entitled "METHOD AND APPARATUS FOR MONITORING A NETWORK ENVIRONMENT." All U.S. patent applications and patents referenced in this paragraph are hereby incorporated by reference in their entity.

TECHNICAL FIELD

Embodiments disclosed herein generally relate to information technology (IT) environments and, in particular, to management of such IT environments. Even more particularly, embodiments disclosed herein provide a system, method, and computer program product for an optimized root cause analysis that can significantly reduce the overall time needed to isolate the root cause or causes of service degradation in an IT environment.

BACKGROUND OF THE RELATED ART

In information technology (IT) environments, performance degradations in service can cause serious impact, particularly in business service management environments. Businesses rely on services performing in reliable and with acceptable response to the end users. A key problem IT environments face is being able to respond and take appropriate actions to address service degradations in a timely and effectively manner. Generally, this relies on the operator's ability to isolate and correct the most likely root causes.

Certain root cause analysis products/technologies are based on the idea of correlating "Events" with other "Events". U.S. Pat. No. 7,131,037, entitled "METHOD AND SYSTEM TO CORRELATE A SPECIFIC ALARM TO ONE OR MORE EVENTS TO IDENTIFY A POSSIBLE CAUSE OF THE ALARM," which is fully incorporated herein by reference, discloses a method and apparatus for providing network performance monitoring, including the identification of a possible cause of a specific alarm in a network environment. This method comprises maintaining a database of alarms and events from a system of monitored elements and automatically identifying a possible cause of a specific alarm by correlating the specific alarm with a plurality of events using the database of alarms and events.

More specifically, in U.S. Pat. No. 7,131,037, an event-to-alarm correlator applies certain rules to events from the database and computes an event score or confidence factor for those events that satisfy the rules. The event score indicates the possibility of the event being the cause of the problem and is represented by a value ranging from the least likely to the most likely.

Advances in information technology continue to bring challenges to IT management. Consequently, there is always room for improvement.

SUMMARY OF THE DISCLOSURE

Conventional root cause analysis (RCA) products/technologies do not leverage the data points being collected but rather use time coupled with policies/rules to help filter out a root cause candidate list. This requires creating and maintaining some kind of rules/policies which is not desirable and not scalable for large environments. Some RCA technologies try to do mathematical correlation on the data between metrics to achieve something similar, but they do not optimize the algorithm by reducing the candidate list to a reasonable size. This can be important as performing the mathematical correlation can be prohibitively expensive and not scalable without first reducing to a reasonable size.

Embodiments disclosed herein provide a system, method, and computer program product for an optimized root cause analysis that can significantly reduce the overall time needed to isolate the root cause or causes of service degradation in an IT environment. Some embodiments provide prioritization which can be useful in large enterprises in performing root cause analysis.

In some embodiments, a data correlation algorithm is applied to an abnormality detection algorithm. This avoids having to apply the data correlation algorithm against all the other metrics being collected and reduces the comparisons to a reasonable amount. In some embodiments, the data correlation algorithm is a Pearson product-moment correlation coefficient. Other suitable linear correlation algorithms may also be used. The data being collected for the primary alarm metric and the data being collected for the candidate list of abnormal metrics is compared using the data correlation algorithm. This allows the degree of correlation to be calculated and consequently allows the root cause candidate list of abnormal metrics to be ranked and ordered.

Applying the data correlation algorithm to the abnormality detection algorithm produces a much more meaningful and practical list for the operator to work off of when trying to isolate the root cause on the service degradation. Without this step, a list of a hundred or more potentially abnormal root cause candidates may be shown to the user without any mathematical consideration of the correlation. With this new approach, the top abnormal events listed in the candidate list are guaranteed to be closely correlated to the primary alarm data and hence most likely to be related to the service degradation. This reduces the time the user needs to spend visually inspecting the data, since for performance degradation the most likely cause of this will now be shown at the top of the candidate list.

Embodiments disclosed herein are not restricted to the domain of network. It is applicable to business service management computer infrastructures, specifically performance as opposed to availability.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 1 depicts a portion of a screenshot of a list of root cause candidates produced by a root cause analysis without optimization disclosed herein;

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

There is a growing need to monitor all aspects of an Information Technology (IT) environment. Prior network monitoring systems are generally limited to monitoring traditional network resources and lack the ability to monitor any application performance domain. In embodiments disclosed herein, the term "network resources" broadly includes resources in the application domain. Applications running on computers in a business environment should be monitored for performance because service degradations are undesirable in IT environments.

Within this disclosure, the term "service" refers to something that an end user or business is or will be using in an IT environment. Examples of services may include, but are not limited to, a user interface, an application, an online retailer, an online bank, and so on. In an IT environment, a service may be measured indirectly through some simulation or via an installed agent. In some cases, service degradation occurs when there is a reduction in performance. For example, it usually takes X minutes to process a transaction and now it takes X+Y minutes. The additional time and thus the service degradation may be caused by repairing or adding a network communications device. For a service degradation involving a web based mail service, it could be that the central processing unit (CPU) overloaded on the web server, or a particular process is overhauling the CPU time, can't get enough CPU resource to service the number of users currently requesting the service, etc.

As disclosed in U.S. Patent Application Publication No. 2006/0200373, network monitoring systems may be used to detect abnormalities in monitored resource elements. As an example, a network monitoring system may have a plurality of monitor instances, each monitoring a specified resource element such as a server. A Root Cause Analysis (RCA) tool may operate to determine if there was an abnormality in a monitored resource element from the data points polled by the corresponding monitor instance.

In some RCA tools, there is a capability which allows users to ask for the "probable causes" of an existing performance problem that has been detected. This feature may be invoked by drilling down on the RCA function for any open alarm in the system. This action may display a candidate list of probable causes of the metric which is in alarm state.

Root Cause Analysis tools generally not leverage the collected data points. One reason is that data correlation can be extremely expensive in terms of time and/or resource. For example, in an IT environment there might be hundreds, if not thousands, of computers, each having many components, including software and hardware components. These computers may be part of the network resources that include applications, computers, network services, and so on, running in this environment. According to embodiments disclosed herein, a performance monitoring system may employ data metrics to monitor these network resources and their performances such as virtual memory capacity, CPU speed, application response time, service response time, network connection time, etc. As a specific example, for each computer, there can be a data metric for application response time, a data metric for CPU utilization, a data metric for memory utilization, a data metric for application availability, and so on.

These data metrics can be grouped in some functional way across different computer platforms and/or associated with various types of events. For example, there may be network based events generated/triggered by communications network outage, network bandwidth utilization reaching the allotted capacity, etc., system based events generated/triggered by high CPU usage, low memory availability, etc., application based events generated/triggered by application response time, availability, etc., and database based events generated/triggered by a sampling or modification of data, etc. Injecting events may also be an event itself. An example of an alarm may be a specific event having a particular value in a severity field. Examples of such a severity value may include, but are not limited to, "Critical", "Minor", etc. The severity of an alarm may be based on how much the event exceeds a normal threshold. For example, if an application response time is set at 10 seconds and it takes the application 11 seconds to respond, a "Minor" alarm may be generated to alert an IT operator of this particular event. There are also non-threshold based alarms known to those skilled in the art.

Thus, in an IT environment, monitoring the underlying infrastructure having thousands of software and hardware components may involve millions of data metrics. The number of data points collected in each data metric may depend on how frequent the resource is polled and for how long. To put it in perspective and as a non-limiting example, suppose on average a data metric collects a data point every minute for 6 hours everyday. In an IT environment with one million data metrics, that equates to approximately 360 million data points. At this size, it would not be practical or efficient to perform data correlation on all the collected data points in conducting a root cause analysis.

U.S. Pat. No. 7,131,037, which is incorporated herein by reference in its entirety, discloses a way to detect abnormalities in a network without having to correlate all the collected data points. This solution focuses on monitoring network problems and relies on domain knowledge to specify/maintain policy and rules used to filter out events unlikely to be the root cause of the problem at issue. More specifically, this method uses time coupled with policies/rules to help filter out a root cause candidate list. Following the above example IT environment in which about one million data metrics are involved in the end-to-end monitoring of the underlying infrastructure, this method may produce a list of approximately one hundred root cause candidates. Users may fine tune the list by eliminating non-related or insignificant abnormalities and events using a smart filtering mechanism that is based on domain (built-in and user-definable) knowledge. One drawback is that this solution may not scale well for large environments—those having a network monitoring system with 100,000 or more data metrics. As the size of the network increases, manual review of the list may become a tedious, time consuming task.

FIG. 1 depicts a portion of a screenshot of a list of root cause candidates produced by a root cause analysis (RCA). Specifically, RCA list 100 may comprise a plurality of events, including event 101 and event 109, and corresponding event time 110, associated monitor instance 120, severity indicator 130, event description 140, and corresponding event score indicator 150. As illustrated in FIG. 1, instead of showing actual event scores, a score bar may be utilized as a visual indicator to show how much correlated a particular event is to the alarm in question. In this example, the alarm indicates "Web URL Total Response Time above 200 ms". RCA list 100 generally shows one event per a monitor instance. If one instance has multiple abnormal events, only the one with the highest score is shown. In this case, list 100 shows at least 13 events, with event 101 "Solaris Process Availability below 100%" from the monitor instance "training4.labs.bmc.com pruner" having the highest event score.

One objective of embodiments disclosed herein is to reduce the overall time it will take a user to isolate a root cause when investigating a problem. Embodiments disclosed herein can perform selective, intelligent, on-demand, comparisons to find a root cause, substantially reducing the time needed for IT operators to isolate the root cause of service degradation. More specifically, embodiments disclosed herein provide a way to significantly minimize the overhead of data correlation in the context of root cause analysis.

To substantially optimize the correlation of an alarm with one or more events, embodiments disclosed herein may allow ranking the degrees of correlation between different data metrics from which an alarm or events were generated. By correlating an alarm with one or more events and ranking the degree of correlation in the context of an overall strategy for root cause, a much more practical candidate list of abnormalities for the root cause may result.

Embodiments disclosed herein may assume that, in addition to events, performance data is also collected by the system. The data being collected for the primary alarm metric and the data being collected for the candidate list of abnormal metrics may be compared using a data correlation algorithm. In some embodiments, the data correlation algorithm is Pearson product-moment correlation coefficient (PMCC). Other data correlation algorithms may also be utilized. Embodiments disclosed herein allow the degree of correlation to be calculated and consequently allow the root cause candidate list of "abnormal" metrics to be ranked and ordered. The ranking or ordering may then be used, if desired, to reduce or trim a list of probable causes to a user. This produces a much more meaningful and practical list for the user to work off of when trying to isolate the root cause on the service degradation.

In embodiment disclosed herein, the top "abnormal" event(s) listed in the candidate list is/are substantially guaranteed to be closely correlated to the primary alarm data—and hence most likely to be related to the service degradation under investigation. This reduces the time the user needs to spend visually inspecting the data since for performance degradations the most likely cause of this will now be shown at the top of the candidate list.

Note that in some cases applying a Pearson product-moment correlation coefficient algorithm between the primary alarm metric and all other metrics in a typical IT environment may not be desirable from a time/performance point of view. Thus, in certain embodiments, it is applied to an embodiment of an existing abnormality detection algorithm as an additional step. This avoids having to apply the data correlation algorithm against all other metrics being collected and reduces the comparisons to a reasonable amount.

Figure 2:
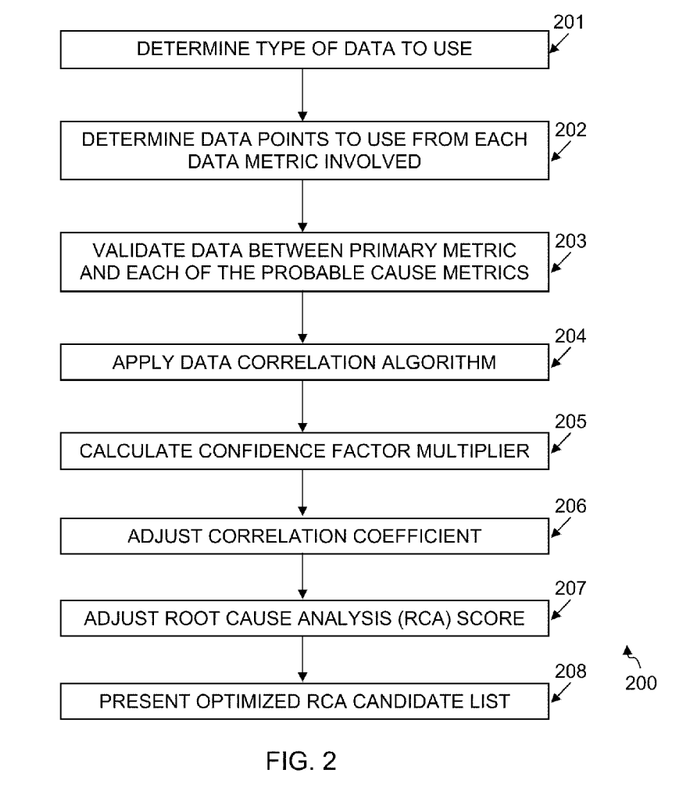
FIG. 2 depicts a flow diagram illustrating one example embodiment of an optimized root cause analysis (RCA) method.

FIG. 2 depicts a flow diagram illustrating one example embodiment of an optimized root cause analysis (RCA) method. With method 200, the resulting candidate list which is shown to a user can be decreased significantly and substantially and ordered in a more relevant way such that the most likely related probable causes can be found easier. As an example, instead of having to sort through a long list of probable causes, an operator or administrator may only need to review a fraction of the probable causes (RCA candidates). In one example, the optimization is approximately ten-fold. That is, where a RCA tool may produce a large list (for example, 100 or more) of potentially abnormal root cause candidates, an embodiment disclosed herein may produce a list that is only a small fraction (for example, 10 or less) of the original list, which is a significant improvement. In most cases, the optimization may have the effect of reducing time to problem isolation from 1 hour to 10 minutes or less.

Some embodiments disclosed herein may build on the ability of an existing abnormality detection tool to correlate an alarm with one or more events. For example, some embodiments disclosed herein may build on RCA list 100 shown in FIG. 1 which already contains a plurality of "abnormal" events, each having a corresponding event score (also referred to herein as the RCA score). RCA list 100 may be generated in various ways. In some embodiments, RCA list 100 may be generated using an embodiment disclosed in U.S. Pat. No. 7,131,037. In some embodiments, RCA list 100 may be generated using an embodiment disclosed in U.S. Patent Application Publication No. 2006/0200373. In some embodiments, a candidate list of "abnormal" events may be generated using static thresholds. In some embodiments, a candidate list of "abnormal" events may be generated using dynamic thresholds. These dynamic thresholds may be comprised of baselines for given metrics. Other abnormality detection algorithms capable of generating a candidate list of probable causes may also be utilized to implement embodiments disclosed here, so long as such a list represents the most likely root cause candidates which the operator should review for problem isolation of the primary alarm and which each is associated with a score having a value between 0 and 100.

In some embodiments, the correlation coefficient between the primary alarm metric and each of the short listed probable causes (metrics) are computed and the final RCA score is adjusted as follows.

Step 201: Determine the type of data to use. By default, raw data for each metric is used for input to the computation of Pearson's coefficient. Raw data with lower granularity is used for computing the correlation as this would give better results than the processed (rated) data which is smoothed by removing spikes in the data.

Step 202: Determine the data points to use from each metric being which will be compared. The data points to be used are determined primarily off of the primary alarm metric alarm time. The alarm time of the primary metric controls what is shown in the RCA result candidate list by default. The following is done depending on what is shown in the RCA candidate list by default:

a) If abnormal events exist on the primary alarm metric within a user-selected RCA window (see FIG. 3, example RCA time window 303), then for each of the abnormal events on the primary alarm, data within the following time window is used from both the primary metric and the secondary metric (i.e., the potential cause candidate):

Data Window Start Time: Abnormal Event time−ABNORMAL_DATA_PERIOD (e.g., 6 hours pre defined constant value)

Data Window End Time: Abnormal Event time+ABNORMAL_DATA_PERIOD b) If no abnormal events exist on the primary alarm metric within the RCA window, then data within the following time window is used:

Start Time: Primary Alarm Time−6 hours (example predefined constant value)

End Time Primary Alarm Time+6 hours or time of RCA, whichever is less.

Step 203: Validate data between the primary metric and each of the probable cause metrics. Discrepancies could arise because of different polling intervals between primary and secondary instances or data is not recorded for either of the instances for various reasons. Thus, data points should to be aligned in time to compute the Pearson correlation coefficient accurately. The following example validation mechanisms may be utilized.

a) Data Cleanup. If the value of the metric is a special value indicating any type of error, it is not used in the computation.
b) Data Alignment. If the absolute time difference between the primary data point and secondary data point is more than half of the max poll interval between secondary and primary instances, the secondary data point is not used in the computation. In some embodiments, the max poll interval is the greater of the two poll intervals being used by the primary metric and the probable cause metric monitors.

Step 204: Apply the data correlation algorithm. In some embodiments of method 200, this step comprises computing the Pearson product-moment correlation coefficient (PMCC) between the primary and secondary matched data points in Step 203.

Step 205: Calculate confidence factor multiplier. This step computes the data point ratio (or confidence factor on theoretical versus actual) between the primary and each of the secondary events. That is, Data point ratio=Actual Data Points/Theoretical Data Points.

The theoretical data points and actual data points are determined as follows:
1) Theoretical Data Points: Based on the total data window computed in step 202, estimate the theoretically possible max data points as:

Total Data Time/Max (Primary Poll Interval, Secondary Poll Interval).

2) Actual Data Points: Compute the total number of valid data points identified in Step 203.

Step 206: Adjust the level of correlation determined in Step 204. Accuracy of the correlation is dependent on how many data points are used in computation.

Thus, in some embodiments, the computed correlation coefficient from Step 204 is adjusted by the confidence factor in the data which is calculated in Step 205. This produces more realistic results.

Final correlation coefficient=theoretically computed correlation*the data point ratio computed.

Step 207: Based on the computed correlation coefficient, the RCA score is adjusted to bubble up the most probable causes and reduce the noise in the final list. Correlation coefficient value ranges from −1 to 1. For scoring purposes, absolute value is used, i.e., the range becomes 0 to 1. In some embodiments, the RCA score is produced utilizing an abnormality detection algorithm disclosed in U.S. Pat. No. 7,131,037. Other abnormality detection algorithms may also be utilized so long as they correlate a specific alarm with one or more events and produce normalized scores between 0 and 100.

In some embodiments, the RCA score may be reduced depending on the correlation value, as illustrated in Table 1 below.

TABLE 1

| Adjusted Correlation Coefficient | RCA Score Reduction Factor (%) |
|---|---|
| >0.8 | 0 |
| 0.6-0.8 | 10 |
| 0.5-0.6 | 20 |
| 0.4-0.5 | 30 |
| 0.3-0.4 | 50 |
| 0.2-0.3 | 75 |
| 0.1-0.2 | 90 |
| 0.0-0.1 | 95 |

Step 208: Present the optimized RCA candidate list to a user through a user interface (see FIG. 4).

Figure 3:
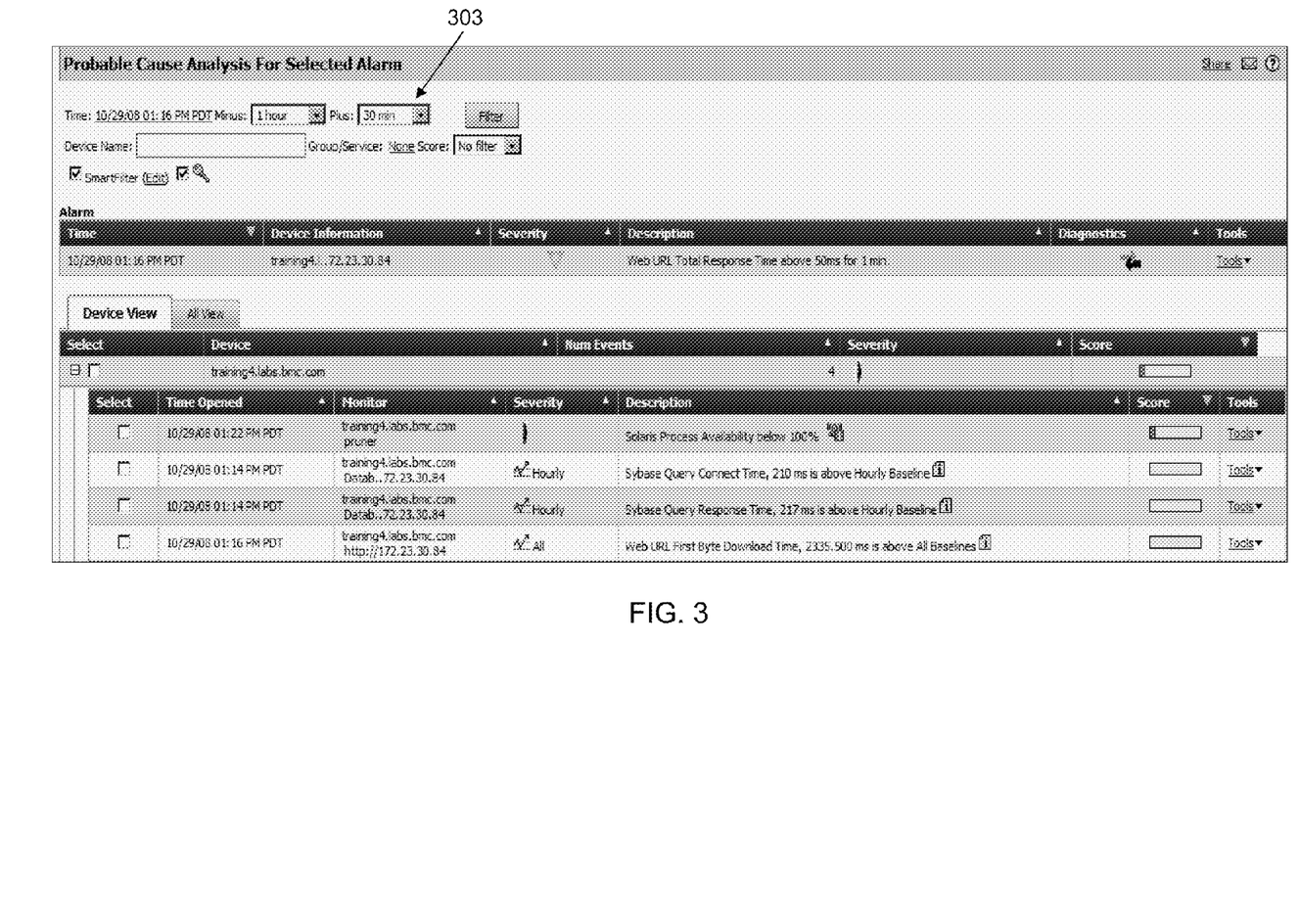
FIG. 3 depicts a portion of a screenshot of a user interface showing an example RCA time window.

FIG. 3 depicts a portion of a screenshot of a user interface showing an example RCA time window. RCA Window is the user-selected time window which controls the start and end time of the probable cause candidate list which is centered around the primary alarm time. The user interface, depicted in FIG. 3 for context, may be used as an interface in conjunction with various functions of a performance monitoring system.

Figure 4:
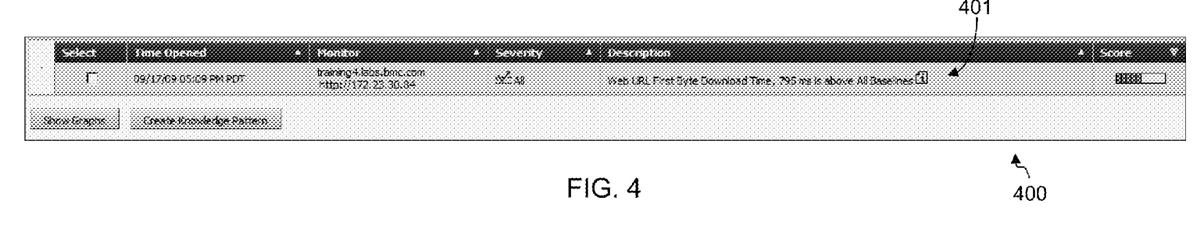
FIG. 4 depicts a portion of a screenshot of an RCA candidate list produced by an example embodiment disclosed herein.

FIG. 4 depicts a portion of a screenshot of an optimized RCA candidate list produced by an example embodiment disclosed herein. In this example, the Pearson product-moment correlation coefficient is applied as part of the score calculation and the top scoring correlated abnormalities are bubbled to the top accordingly. Compare RCA list 100 shown in FIG. 1 with optimized RCA list 400 shown FIG. 4, it can be seen that the number of probable causes (candidates) has been substantially and significantly reduced from 13 (FIG. 1) to 1 (FIG. 4).

More specifically, in FIG. 1, event 109 is listed as one of 13 probable causes correlated to a particular alarm. Without the above-described optimization, event 109 has a corresponding event score that places event 109 in the tenth spot for user review on RCA list 100. With the above-described optimization, the same event is listed as top event 401 on optimized RCA list 400. The corresponding event score for top event 401 in FIG. 4 is the same as event 109 in FIG. 1. However, the importance of this particular event is made evident by the mathematical correlation of data points from all data metrics involved. After optimization, only top event 401 is listed for user review, resulting in a substantial reduction in time and resources required to isolate the problem at issue.

As mentioned above, the number of data points collected depends in part on the length of time specified and the number of data metrics utilized to monitor the underlying infrastructure of the IT environment. Following the above example, suppose a performance monitoring system operates to collect samples at an interval of one data point per minute for six hours everyday, that is 360 data points for one metric. Suppose there are one million data metrics in the system, then for a time window of six hours the system would have 360 million data points. It would be impractical to compute data correlation on all 60 million data points.

Aspects and embodiments disclosed herein provide certain technical advantages. One advantage of building on the ability of an abnormality detection algorithm to correlate an alarm with one or more events is that the number of data metrics is already reduced down to a manageable size of about 100 or less. Thus, in the above example IT environment where there are one million data metrics, the system would only need to apply data correlation to 36,000 data points, compared to generally applying data correlation to 360 million data points.

Furthermore, while other Root Cause Analysis technologies are substantially restricted to the context of network operations, embodiment disclosed herein are not restricted to the domain of networks and are applicable to business service management computer infrastructures—including performance (as opposed to availability), among others.

Figure 5:
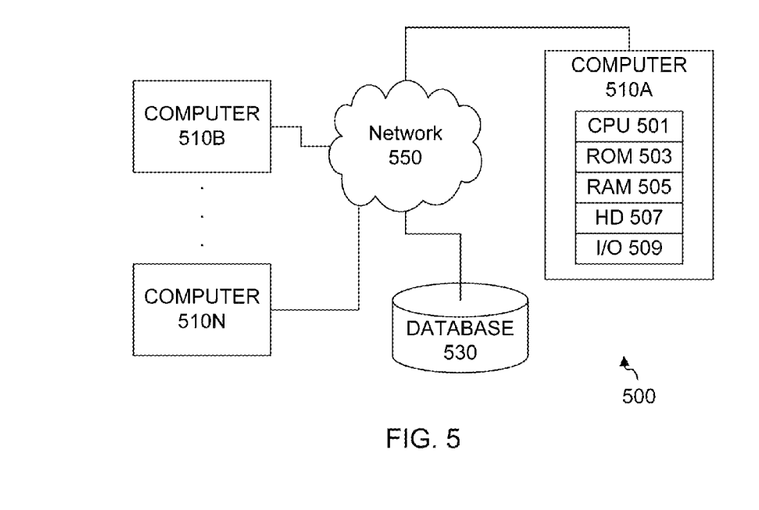
FIG. 5 depicts a simplified network architecture for an example IT environment where embodiments disclosed herein may be implemented.

FIG. 5 depicts a simplified network architecture for an example IT environment where embodiments disclosed herein may be implemented. Additional examples of network architecture and computer hardware suitable for implementing embodiments disclosed herein can be found in the above-referenced U.S. Pat. Nos. 7,502,844, 6,453,346, and 6,327,677 and U.S. Patent Application Publication No. 2006/0200373, which are fully incorporated herein. As one skilled in the art can appreciate that the exemplary architecture shown and described with respect to FIG. 5 is meant to be illustrative and not limiting.

In FIG. 5, IT environment 500 may comprise network 550. Network 550 can be characterized as an internal network. Network 550 may be connected to an external network. The Internet might be an example of an external network and a company's intranet might be an example of an internal network. Each network can be bi-directionally coupled to a variety of networked systems, devices, repositories, etc.

In the simplified configuration shown in FIG. 5, network 550 is bi-directionally coupled to a plurality of computers and/or machines 510A-N. Computers 510A-N may comprise at least a server machine and a client machine. Virtually any piece of hardware or electronic device capable of running client software and communicating with a server can be considered a client machine. As an example, computer 510A may include a central processing unit (CPU) 501, read-only memory (ROM) 503, random access memory (RAM) 505, hard drive (HD) or non-volatile memory 507, and input/output (I/O) device(s) 509. An I/O device may be a keyboard, monitor, printer, electronic pointing device (e.g., mouse, trackball, etc.), or the like. The hardware configuration of computer 510A can be representative to other devices and computers alike coupled to network 550 (e.g., desktop computers, laptop computers, personal digital assistants, handheld computers, cellular phones, and any electronic devices capable of storing and processing information and network communication). Computer 510B may implement a performance monitoring system and may connect to database 530 and computer 510A via network 550. Database 530 may store data metrics used by performance monitoring system 510 to monitor IT environment 500. In some embodiments, computer 510B may run an optimized Root Cause Analysis according to an embodiment disclosed herein and an optimized list of RCA candidates may be presented to a user of computer 510A over network 550.

Embodiments disclosed herein may be implemented in suitable software including computer-executable instructions. As one skilled in the art can appreciate, a computer program product implementing an embodiment disclosed herein may comprise one or more computer-readable storage media storing computer-instructions translatable by one or more processors in IT environment 500. Examples of computer-readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers. Moreover, the functionality of the RCA optimization system and method may be combined into one or more pieces of software and/or hardware.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A root cause analysis optimization method, comprising:
   at a performance monitoring system, identifying a primary alarm metric and one or more probable cause metrics involved in producing a list of root cause analysis (RCA) candidates, wherein each of the RCA candidates is associated with an RCA score that indicates a level of correlation between each RCA candidate and the primary alarm metric;
   determining data points to use from the primary alarm metric and each probable cause metric based on an alarm time of the primary alarm metric;
   validating the data points between the primary alarm metric and each probable cause metric to remove discrepancies by aligning the data points in time to compute a correlation coefficient;
   applying a data correlation algorithm to the validated data points to compute the correlation coefficient between primary and secondary aligned data points;
   calculating a confidence factor by computing a data point ratio between the primary and secondary aligned data points using actual data points and theoretical data points;
   adjusting the level of correlation of the validated data points by adjusting the correlation coefficient using the confidence factor including the data point ratio;
   adjusting the RCA scores of the RCA candidates based on the computed correlation coefficient including using the adjusted correlation coefficient; and
   presenting to a user an optimized RCA candidate list listing a fraction of the RCA candidates sorted based the adjusted RCA score.

2. The root cause analysis optimization method according to claim 1, wherein determining data points to use further comprises:
   determining whether abnormal events exist on the primary alarm metric within a user-selected RCA time window.

3. The root cause analysis optimization method according to claim 1, wherein validating the data points further comprises:
   discarding erroneous data points.

4. The root cause analysis optimization method according to claim 1, wherein validating the data points further comprises:
   discarding misaligned data points.

5. The root cause analysis optimization method according to claim 4, wherein discarding misaligned data points further comprises:
   determining an absolute time difference between a primary data point and a secondary data point;
   comparing the absolute time difference with half of a maximum poll interval; and
   if the absolute time difference is more than half of the maximum poll interval, discarding the secondary data point.

6. The root cause analysis optimization method according to claim 5, wherein the theoretical data points are determined utilizing the maximum poll interval.

7. The root cause analysis optimization method according to claim 6, wherein the actual data points are determined utilizing the validated data points.

8. The root cause analysis optimization method according to claim 1, wherein the correlation coefficient ranges from −1 to 1, and wherein applying a data correlation algorithm to the validated data points further comprises:
   taking an absolute value of the correlation coefficient.

9. The root cause analysis optimization method according to claim 1, wherein adjusting the correlation coefficient further comprises:
   multiplying the correlation coefficient with the data point ratio.

10. The root cause analysis optimization method according to claim 1, wherein adjusting the RCA scores of the RCA candidates further comprises:
    reducing the RCA score by applying the adjusted correlation coefficient to a corresponding RCA score reduction factor.

11. The root cause analysis optimization method according to claim 1, wherein each of the primary alarm metric and the one or more probable cause metrics collects data utilized by the performance monitoring system to monitor an infrastructure of a computing environment and wherein the infrastructure comprises business services.

12. A computer program product comprising one or more non-transitory computer-readable storage media storing computer instructions translatable by one or more processors of a computer system to perform:
    identifying a primary alarm metric and one or more probable cause metrics involved in producing a list of root cause analysis (RCA) candidates, wherein each of the RCA candidates is associated with an RCA score that indicates a level of correlation between each RCA candidate and the primary alarm metric;
    determining data points to use from the primary alarm metric and each probable cause metric based on an alarm time of the primary alarm metric;

validating the data points between the primary alarm metric and each probable cause metric to remove discrepancies by aligning the data points in time to compute a correlation coefficient;

applying a data correlation algorithm to the validated data points to compute the correlation coefficient between primary and secondary aligned data points;

calculating a confidence factor by computing a data point ratio between the primary and secondary aligned data points using actual data points and theoretical data points;

adjusting the level of correlation of the validated data points by adjusting the correlation coefficient using the confidence factor including the data point ratio;

adjusting the RCA scores of the RCA candidates based on the computed correlation coefficient including using the adjusted correlation coefficient; and presenting to a user an optimized RCA candidate list listing a fraction of the RCA candidates sorted based the adjusted RCA score.

13. The computer program product of claim 12, wherein the computer instructions are further translatable to perform:
determining whether abnormal events exist on the primary alarm metric within a user-selected RCA time window.

14. The computer program product of claim 12, wherein the computer instructions are further translatable to perform:
discarding erroneous data points and misaligned data points.

15. The computer program product of claim 12, wherein the computer instructions are further translatable to perform:
determining an absolute time difference between a primary data point and a secondary data point;
comparing the absolute time difference with half of a maximum poll interval; and
if the absolute time difference is more than half of the maximum poll interval, discarding the secondary data point.

16. The computer program product of claim 12, wherein the computer instructions are further translatable to perform:
multiplying the correlation coefficient with the data point ratio.

17. The computer program product of claim 12, wherein the computer instructions are further translatable to perform:
reducing the RCA score by applying the adjusted correlation coefficient to a corresponding RCA score reduction factor.

18. A system, comprising:
one or more processors; and
one or more computer-readable storage media storing computer instructions translatable by the one or more processors to perform:
identifying a primary alarm metric and one or more probable cause metrics involved in producing a list of root cause analysis (RCA) candidates, wherein each of the RCA candidates is associated with an RCA score that indicates a level of correlation between each RCA candidate and the primary alarm metric;
determining data points to use from the primary alarm metric and each probable cause metric based on an alarm time of the primary alarm metric;
validating the data points between the primary alarm metric and each probable cause metric to remove discrepancies by aligning the data points in time to compute a correlation coefficient;
applying a data correlation algorithm to the validated data points to compute the correlation coefficient between primary and secondary aligned data points;
calculating a confidence factor by computing a data point ratio between the primary and secondary aligned data points using actual data points and theoretical data points;
adjusting the level of correlation of the validated data points by adjusting the correlation coefficient using the confidence factor including the data point ratio;
adjusting the RCA scores of the RCA candidates based on the computed correlation coefficient including using the adjusted correlation coefficient; and
presenting to a user an optimized RCA candidate list listing a fraction of the RCA candidates sorted based the adjusted RCA score.

19. The system of claim 18, further comprising:
a user interface, wherein the optimized RCA candidate list is displayed to the user via the user interface.

20. The system of claim 19, further comprising:
a database storing the primary alarm metric and the one or more probable cause metrics.

* * * * *